MAGNETIC FIELD STABILIZER FOR A SUPERCONDUCTIVE DEVICE

Filed July 9, 1963

INVENTORS C. F. HEMPSTEAD
Y. B. KIM

Sylvan Sherman
ATTORNEY

1

3,234,435

MAGNETIC FIELD STABILIZER FOR A SUPERCONDUCTIVE DEVICE

Charles F. Hempstead, Millington, and Young B. Kim, North Plainfield, N.J., assignors to Bell Telephone Laboratories, Incorporated, New York, N.Y., a corporation of New York Filed July 9, 1963, Ser. No. 293,612
4 Claims. (Cl. 317—158)

Figure 1:
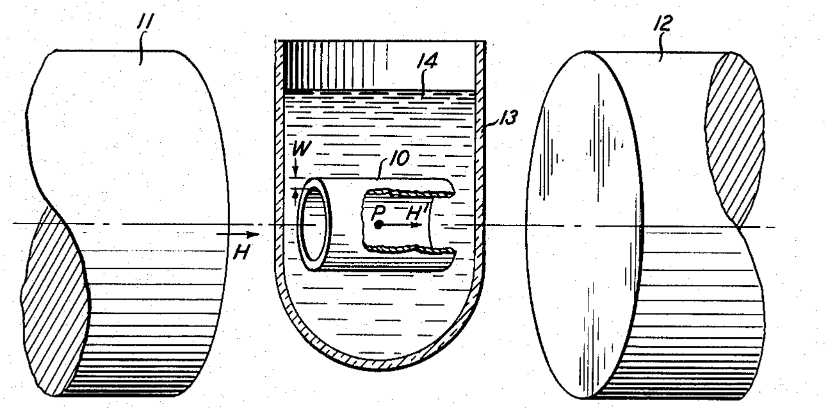

This invention relates to magnetic circuits and, more specifically, to magnetic field stabilizers.

In many areas of modern physical research a need exists for very high, controllable magnetic fields. In the past these fields have been produced by conventional electromagnets and, more recently, by superconducting magnets including those of the flux-concentrator variety. In most applications such magnets have proved satisfactory. However, where an extremely stable field is required over a relatively long time interval, additional stabilizing means must be employed.

Accordingly, it is one object of the present invention to provide a highly stable, sustained magnetic field.

In the past it was possible to achieve some degree of magnetic field stabilization with a closed-loop or negative feedback-type system. Such a system, however, requires the use of additional circuits which are complicated, relatively expensive, and require additional power to operate. In addition, long term field stability is somewhat difficult to achieve with such a system.

It is therefore a further object of the present invention to provide a highly stable, sustained magnetic field over a relatively long time interval.

It is yet another object of the present invention to provide magnetic field stabilization by means of the characteristic critical state behavior of hard, superconducting materials.

In accordance with the principles of the present invention the stabilization of magnetic fields is accomplished by the use of a hard, superconducting cylinder surrounding the working space or region to be stabilized. For the purpose of the present invention, the term "hard superconductor" or "hard superconducting material" is understood to refer to that class of superconducting materials which display an incomplete Meissner effect. The behavior of such material has been attributed to meshes of superconducting filaments imbedded in and throughout the material. Characteristic members of this class of materials are niobium, niobium-zirconium alloys and niobium-tin compounds.

When such a cylinder is placed within a magnetic field and the applied field is varied, currents are induced in the cylinder wall causing the field in the hollow interior of the cylinder to be different than the applied field. On a plot of the externally applied field (H) vs. the interior field (H'), the branches of the critical state curve bounding the transition from the superconducting-to-normal state of the cylinder are hyperbolas symmetrical about the line H=H. For values of H and H' lying between these two hyperbolas the cylinder does not carry critical currents. Therefore, any changes in the externally applied field induce currents opposing that change and thus maintain the field inside the cylinder at a substantially constant level.

Figure 2:
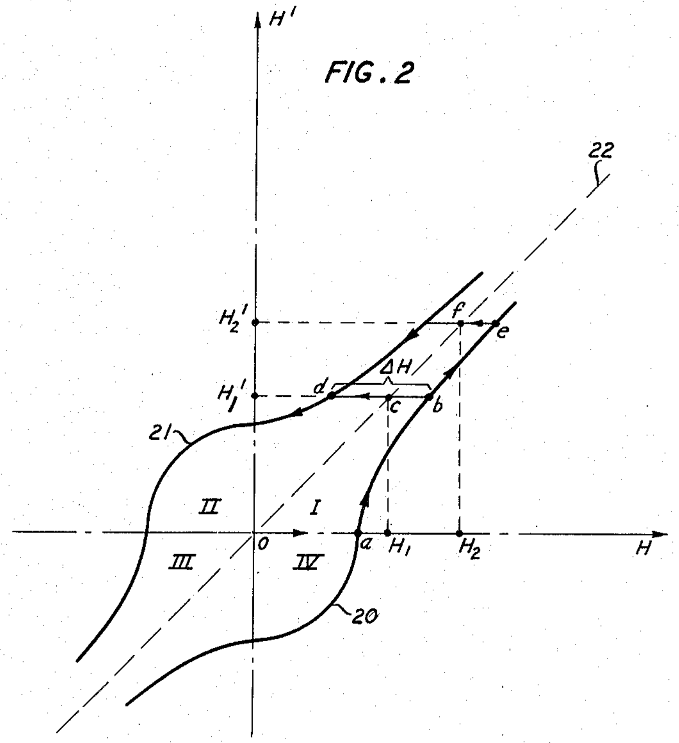

The above-mentioned and other features and objects of this invention will become more apparent by reference to the following description taken in conjunction with the accompanying drawings in which:

FIG. 1 is a pictorial view, partially broken away, of one embodiment of the present invention; and FIG. 2 is a graphical representation of the critical state curve of the superconducting cylinder of FIG. 1 illustrating the method of magnetic field stabilization.

2

Referring more specifically to the drawings, FIG. 1 is a pictorial view, partially broken away, of one embodiment of the present invention. A hollow right circular cylinder 10 having a wall thickness $w$ is positioned between the pole pieces 11 and 12 of a magnet having a controllable magnetic field. Cylinder 10 is fabricated of a "hard superconducting" material. Materials suitable for this purupose include sintered niobium powder, niobium-zirconium alloys, niobium-tin, vanadium-gallium and vanadium-silicon compounds.

Surrounding cylinder 10 is a suitable cryostat structure shown in its simplified form as a Dewar flask 13. For reasons of clarity, the suspension means for cylinder 10 and Dewar flask 13 are not shown in FIG. 1. Likewise only the pole pieces 11 and 12 of the magnet are shown. Dewar flask 13 is partially filled with a liquid having a very low boiling point such as liquid helium. This serves to maintain cylinder 10 at a temperature below its critical temperature (i.e., the temperature at which cylinder 10 reverts to its nonsuperconducting state).

The operation of the embodiment of FIG. 1 can be readily described with references to the critical state curve shown in FIG. 2. Branches 20 and 21 of the curve FIG. 2 are obtained by applying an external magnetic field H parallel to the axis of cylinder 10 in the manner shown in FIG. 1 and measuring the field H' at a point P inside cylinder 10.

Branches 20 and 21 define a critical state of cylinder 10. This critical state is, in turn, defined as that state wherein every macroscopic region of a superconductor carries a critical current density J determined by the local magnetic field B in that region. It has been found that for a particular group of hard superconducting materials, such as those mentioned hereinbefore, this current field relationship is given by the formula $$J(B+B_0)=\alpha_c \qquad (1)$$

where $B_0$ and $\alpha_c$ are empirical constants derived from experimental data and are determined by the nature of the cylinder material and the temperature of operation. For a more detailed discussion of the constants $\alpha_c$ and $B_0$ see the articles: "Critical Persistent Currents in Hard Superconductors" by Y. B. Kim, C. F. Hempstead and A. R. Strnad, appearing in the Physical Review Letters, vol. 9, No. 7, pp. 306–309, October 1, 1962; and "Magnetization and Critical Supercurrents" by Y. B. Kim, C. F. Hempstead and A. R. Strnad appearing in the Physical Review, vol. 129, No. 2, page 528, January 1963. In terms of the external and internal magnetic fields H and H', it follows that $$(H'+B_0)^2-(H+B_0)^2=\pm 8\pi w\alpha_c \qquad (2)$$

The minus sign of Equation 2 applies for values of H' greater than zero and less than H, whereas the plus sign applies to values of H greater than zero and less than H'. The result is that branches 20 and 21 are hyperbolas in the first and third quadrants, symmetrical about the 45 degree line 22, and circles in the second and fourth quadrants. The two branches 20 and 21 of the critical state curve thus bound a region within which cylinder 10 is in its superconducting state. However, within this region the cylinder walls do not carry critical supercurrents. The result is that any change in the external field can be "shielded" from the interior of the cylinder by a change in the wall currents.

In operation, cylinder 10 is placed around the region wherein the field is to be stabilized. Such a region typically could include a traveling wave microwave maser or some other such device which advantageously is operated in a region of constant magnetic field at cryogenic temperatures. As external field H is initially increased from zero, supercurrents are induced in the wall of cylinder 10 which produces a field opposing external field H. The net result is that initially the externally applied field is shielded from the interior of cylinder 10 and H' remains substantially zero. This transversal is indicated by the arrow between the origin and point *a* on branch 20.

When point *a* is reached, the wall of cylinder 10 is saturated with the maximum supercurrent permitted by the material at the particular temperature at which it is operating. By further increasing the external field H, the internal field H' increases along branch 20 since the wall curents can no longer increase. If at some point *b* on branch 20, the external field H is decreased, the wall currents of cylinder 10 decrease in a manner such as to keep the interior field at a constant value $H_1'$. This constant value $H_1'$ is maintained as the external field H is decreased until the critical state at point *d* on branch 21 is reached. If the external H is decreased still further, the internal field H' decreases along curve 21.

Returning again to point *b* on branch 20, if the external field H is decreased to a point *c* where $H_1=H_1'$, then it is clear from FIG. 2 that the internal field $H_1'$ will remain constant for any change of H in either direction less than $\Delta H/2$. If a new value of H' is desired, H is either increased to the shielding branch 20 and the cylinder taken up to a higher H' such as $H_2'$, or H is decreased to the trapping branch 21 and the cylinder taken down to a lower H'. The cylinder is then placed in a noncritical state. At any point such as *c* or *f* in the region between branches 20 and 21, a long-term stabilized magnetic field is achieved. The field inside the cylinder remains constant so long as the cylinder remains superconducting and provided the external field H does not change enough in either direction to return the cylinder to a critical state.

The horizontal distance ΔH between branches 20 and 21 represents the maximum amount of variation in the external field H which produces no substantial change in the interior field H'. An approximate value of ΔH is given by the equation $$\Delta H \approx \frac{8\pi\alpha_c w \times 10^{-4}}{H'+B_o} \qquad (3)$$

where ΔH, H' and $B_o$ are in kilogauss; *w* is in centimeters; and $\alpha_c$ in kilogauss-amperes/centimeter$^2$. Ordinarily, after increasing the external field H along branch 20 to a value corresponding to a given interior field H', the external field H need be decreased only by an amount slightly greater than the anticipated magnitude of any fluctuations in H. Since the magnitude of these fluctuations can vary in an unpredictable manner, however, H is preferably decreased to a value substantially equal to H', (i.e., H is decreased by an amount substantially equal to $\Delta H/2$). This enables the device to stabilize maximum fluctuations in the external field H in either direction.

For example, a practical embodiment utilizing a cylinder constructed of $3Nb=Zr$ with a wall thickness of .015 inch was constructed. For this cylinder $\alpha_c=4.55\times10^4$ kilogauss-ampere/cm.$^2$ and $B_o=300$ gauss at 4.2 degrees Kelvin. At an internal field $H_1'$ equal to 7 kilogauss, the noncritical region covers a range ΔH of 600 gauss, so that if biased at point *c*, the cylinder is able to shield changes in H of ±300 gauss. As seen from FIG. 2, the magnitude of ΔH decreases with increasing H, but even at a field H' of 30 kilogauss, the cylinder will still shield against changes of ±80 gauss, which incidentally, is a much larger change than will be encountered in most practical applications.

As mentioned above, the shape of the critical state curve shown in FIG. 2 is hyperbolic in the first and third quadrants. The position of the two branches 20 and 21 can be manipulated to suit a variety of particular applications. As seen from Equation 2, the position of branches 20 and 21 with respect to the 45 degree line 22, is determined primarily by the product $w\alpha_c$. As this factor increases, the two branches move away from the 45 degree line and the width of the noncritical region increases. The product $w\alpha_c$ can be controlled over a wide range by the selection of a suitable cylinder material and wall thickness. Furthermore, the consant $\alpha_c$ for a given material can, in general, be controlled by an annealing process. (See the above-mentioned article "Magnetization and Critical Supercurrents," by Kim et al.)

In all cases it is understood that the above-described structure represents only one illustrative embodiment of the present invention. Other embodiments including those utilizing different cylinder geometries and materials can be constructed by those skilled in the art without departing from the spirit and scope of the present invention.

What is claimed is:

1. The method of obtaining a stabilized magnetic field having a given value H' in a region, comprising the ordered steps of surrounding said region with a hollow superconducting cylinder having a wall thickness *w*, said cylinder being constructed of a material having a critical state curve given by the equation $$(H'+B_o)^2-(H+B_o)^2=\pm 8\pi\alpha_c w$$

where $B_o$ and $\alpha_c$ are empirical constants of said material, gradually subjecting said cylinder to an increasing external magnetic field H until said given value of H' is reached within said region, and reducing said external field to a value substantially equal to said given value.

2. The method according to claim 1 comprising the additional step of further reducing said external field until a second given value of H' is reached and increasing said external field to a value substantially equal to said second given value.

3. A magnetic field stabilizer comprising in combination, a hollow superconducting cylinder having a wall thickness *w*, said cylinder being constructed of a material having a critical state curve given by the equation $$(H'+B_o)^2-(H+B_o)^2=\pm 8\pi\alpha_c w$$

where $B_o$ and $\alpha_c$ are empirical constants of said material, H is the magnetic field to be stabilized, and H' is the magnetic field inside said cylinder, and means for gradually increasing an external magnetic field H applied to said superconducting cylinder until a predetermined value of H' is reached within said cylinder and for subsequently decreasing H by a value less than $$\frac{8\pi\alpha_c w \times 10^{-4}}{H'B_o}$$

4. The method of obtaining a stabilized magnetic field having a given value H' in a region, comprising the steps of surrounding said region with a hollow cylinder of hard superconducting material, gradually subjecting said cylinder to an external magnetic field H until said given value of H' is reached, and gradually reducing said external field to a value substantially equal to said given value.

References Cited by the Examiner

UNITED STATES PATENTS 3,156,850 11/1964 Walters ---------- 317—158 X

BERNARD A. GILHEANY, *Primary Examiner.*

JOHN F. BURNS, *Examiner.*